UNITED STATES PATENT OFFICE.

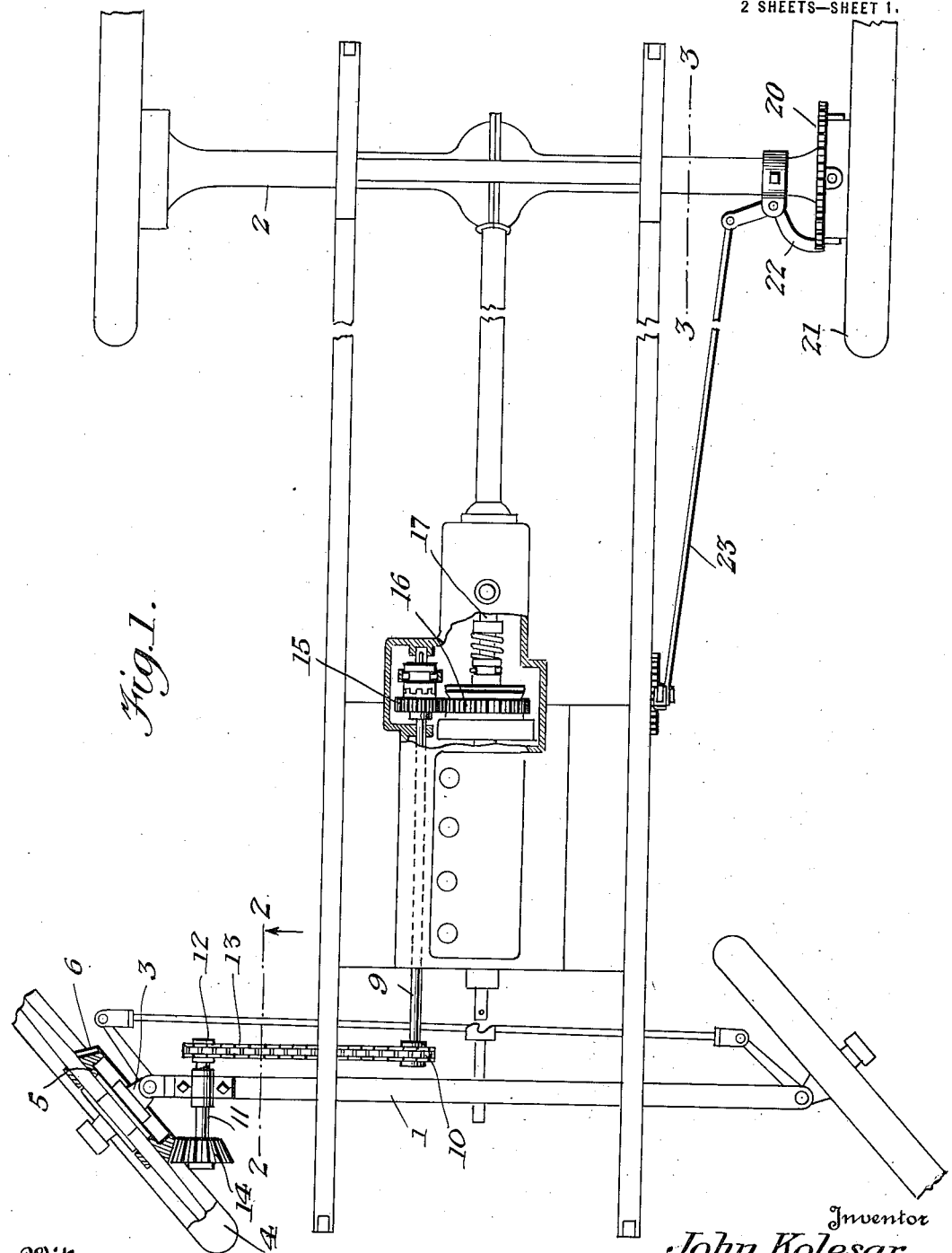

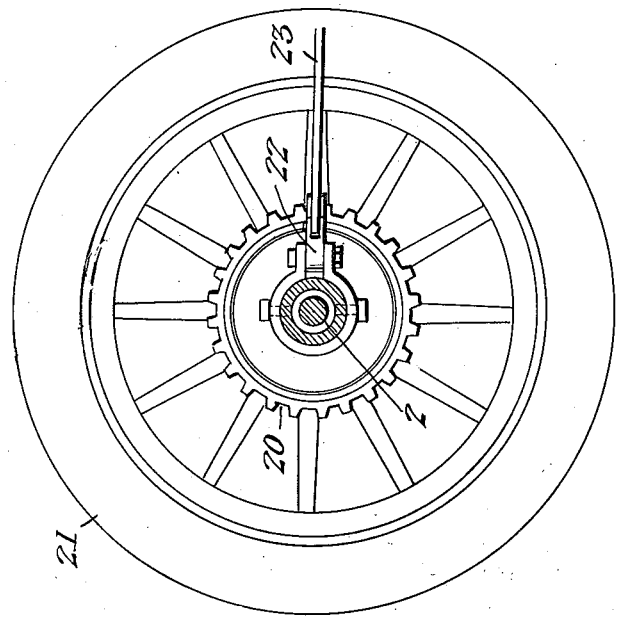
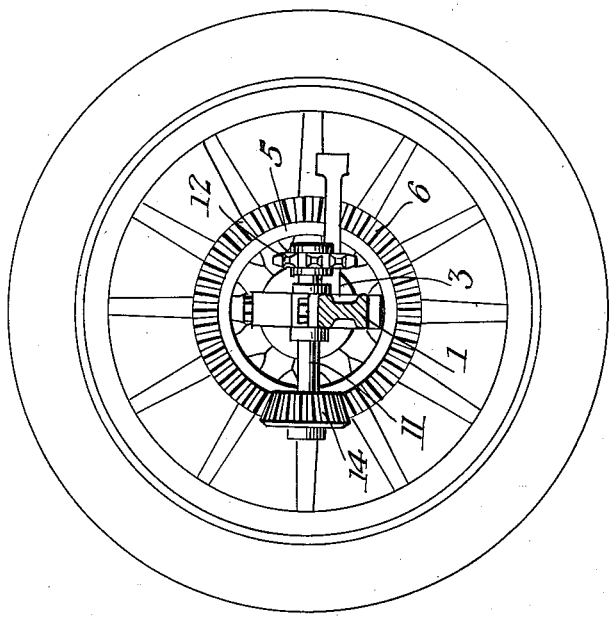

JOHN KOLESAR, OF WOODLAND, MAINE.

AUTOMOBILE-TURNING DEVICE.

1,303,805.

Specification of Letters Patent.   Patented May 13, 1919.

Application filed July 22, 1918.   Serial No. 246,075.

*To all whom it may concern:*

Be it known that I, JOHN KOLESAR, a citizen of the United States, residing at Woodland, in the county of Washington and State of Maine, have invented new and useful Improvements in Automobile-Turning Devices, of which the following is a specification.

This invention comprehends the provision of a mechanism applicable to most all makes of automobiles, and by means of which the machine may be turned in a small space.

Most specifically stated, the invention provides a mechanism for the above mentioned purpose, and when employed use is made of one of the front wheels as a drive wheel, while one of the back wheels is locked against rotation and serves as a pivot.

The nature and advantages of the invention will be better understood when the following description is read in connection with the accompanying drawings, wherein like numerals of reference indicate similar parts in the several views.

Figure 1 is a plan view of the turning device.

Fig. 2 is a sectional view taken on line 2—2 of Fig. 1 looking in the direction of the arrow.

Fig. 3 is a similar view taken on lines 3—3 of Fig. 1.

Referring to the drawings in detail, 1 indicates the front axle of the machine and 2 the rear axle thereof. Spindles 3 are pivotally connected to the front axle 1 by means of knuckle members in the usual manner and the front wheels 4 are journaled upon said spindles. A wheel 5 is fixed with relation to one of the forward wheels 4 and is provided with a set of gear teeth 6. A longitudinally disposed shaft 9 is mounted for rotation and carries at its forward end a sprocket wheel 10. A shaft 11 is journaled upon the front axle 1, parallel with the shaft 9, and carries at its rear end a sprocket wheel 12. A chain 13 is trained around the sprocket wheels 10 and 12 and is adapted to transmit rotary movement from the shaft 9 to the shaft 11. The shaft 11 carries at its forward end a gear wheel 14 which is adapted to mesh with the teeth of the wheel 5 when the front wheels 4 are swung to a position at an angle to the axle 1 as shown in Fig. 1. Mounted upon the shaft 9 adjacent its rear end is a gear 15 which meshes with the gear 16 mounted on the engine shaft 17.

With a view of locking one of the rear wheels of the machine against rotation, a toothed wheel 20 is employed and suitably mounted and secured to the wheel to be locked. A pivoted locking dog 22 is suitably mounted upon the axle housing, and connected to one end of a rod 23 provided for moving the dog 22 into and out of engagement with the toothed wheel 20.

When it is desired to use the turning mechanism herein illustrated, the locking dog 22 is moved into engagement with the wheel 20 thereby locking the wheel 21 against rotation, it being understood that the wheel 21 when so locked serves as a pivot for the turning of the machine. The gear controlled lever of the machine not shown is placed in neutral position, and subsequent to the turning of the front wheels 4 in the manner shown in Fig. 1 so that the gear 14 will mesh with the gear 5, the engine of the machine is started. Manifestly, one of the front wheels serves as a drive wheel for turning the machine while the wheels 21 at the rear serves as a pivot therefor. By means of the turning mechanism, the machine may be turned in a very narrow space.

What I claim is:—

1. A mechanism for turning an automobile having two rear driven wheels connected by a differential, comprising means for locking one of the rear wheels against rotation, a gear wheel carried by one of the front wheels of the machine, and a second gear driven by the motor and disposed to mesh with the first mentioned gear when the front wheels are turned at an angle to the front axle.

2. A mechanism for turning an automobile having two rear driven wheels connected by a differential, comprising means for locking one of the rear wheels against rotation, a gear wheel mounted upon the front axle for rotation, a motor driven shaft, a connection between the shaft and said gear wheel whereby the latter is rotated, and a gear carried by one of the front wheels and adapted to mesh with the first mentioned gear wheel when the front wheels are turned at an angle to the front axle.

3. A mechanism for turning an automobile having two rear driven wheels connected by a differential, comprising a gear carried by one of the front wheels of the machine, means providing a connection between the motor and said wheel for driving the latter when the front wheels are turned at an angle to the front axle, a toothed wheel carried by one of the rear wheels of the machine, and a pivoted pawl adapted to engage the toothed wheel to lock the rear wheel against rotation whereby the rear wheel serves as a pivot for the turning of the machine, and means for actuating the pawl.

In testimony whereof I affix my signature.

JOHN KOLESAR.